Patented Nov. 19, 1935

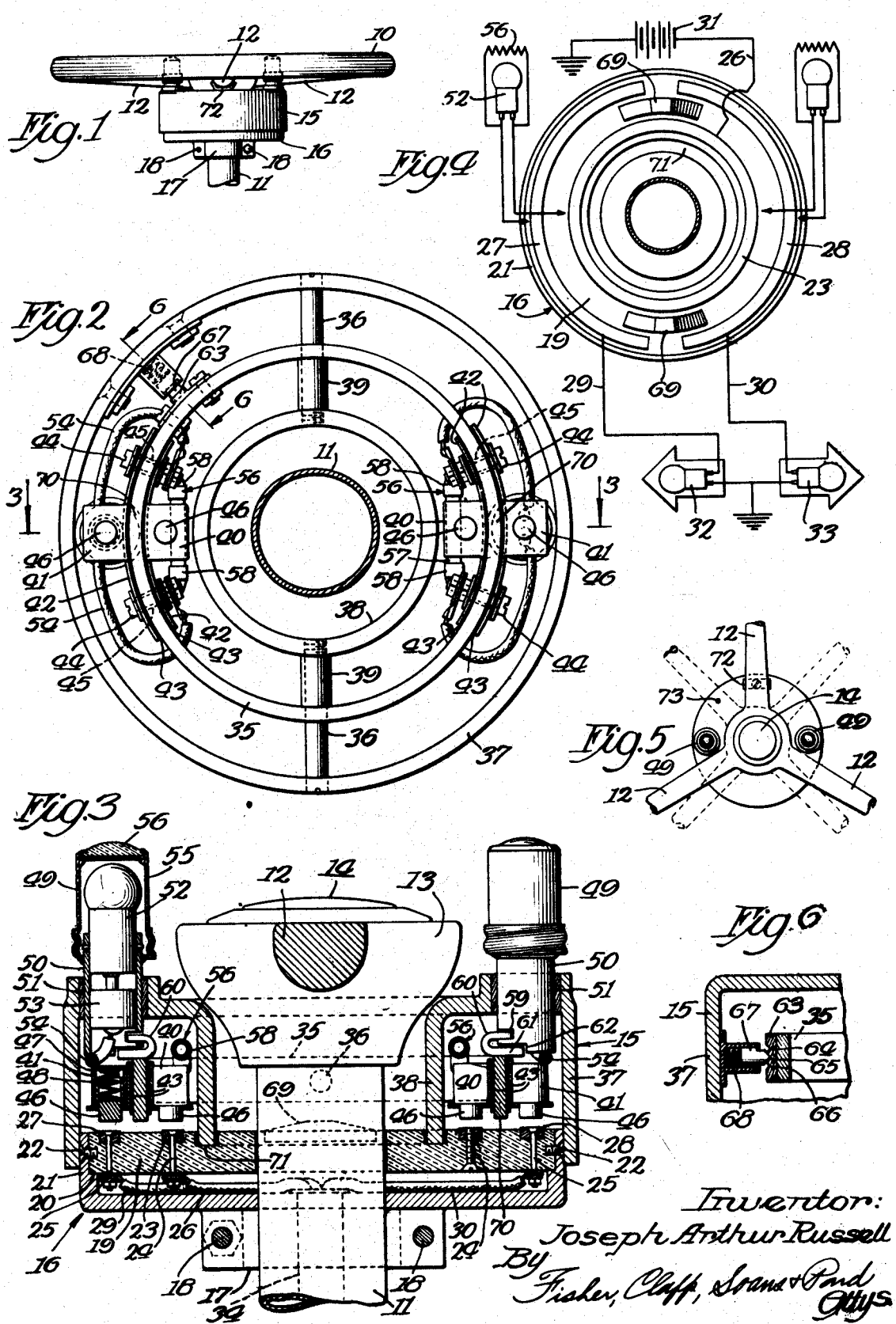

2,021,386

UNITED STATES PATENT OFFICE 2,021,386

AUTOMOBILE SIGNAL SWITCH

Joseph Arthur Russell, Berwyn, Ill.

Application April 6, 1933, Serial No. 664,707

7 Claims. (Cl. 200—59)

This invention relates to improvements in an automobile signal switch and more particularly to improvements in mechanism for signalling to other motorists a driver's intention to make a right or left turn.

The main objects of the invention are to provide an electric signal controlling device of the class described which may be actuated to give the desired signal well in advance of the movement signalled; to provide a device wherein the signal will be automatically restored to non-indicating condition when the signalled movement is well under way; to provide an arrangement in which the signal may be given considerably in advance of the time of the movement signalled and in which limited preparatory movement of the vehicle may be accomplished without affecting the signal given; to provide an arrangement in which the driver of the vehicle will be given positive warning in the event that the signal fails to operate; to provide a device of the class described which is comparatively simple in construction and hence low in cost and which will be durable and free from delicate parts which are apt to become deranged; to provide a device of the class described which will be adaptable to most, if not all, of the standard vehicles now on the market; and in general, it is the object of the invention to provide an improved electric signal controlling device of the class described.

Other objects and advantages will be understood by reference to the following specification and accompanying drawing wherein I have illustrated an electric signal controlling device applicable to an automobile steering wheel.

In the drawing—

Fig. 1 is a side elevation;

Fig. 2 is a bottom plan showing the mechanism of the interior of a housing portion which is associated with the steering wheel;

Fig. 3 is a vertical section through the device substantially of the line 3—3 of Fig. 2;

Fig. 4 is a plan of the mechanism contained by a lower housing section which is secured to the steering post or column, a wiring diagram being also incorporated in this figure;

Fig. 5 is a fragmentary plan of the device as illustrated in Fig. 1; and

Fig. 6 is a section on the line 6—6 of Fig. 2.

Referring now to the drawing, I have illustrated a steering wheel 10 at the top of a steering post or column 11, these parts corresponding or representing the steering wheel and post of any conventional automobile. The steering wheel 10 is connected by means of spokes 12 to a hub 13 which has a conventional connection to a rod within the column 11. Other suitable devices, such as a horn button 14, may be mounted in or on the hub of the wheel.

The mechanism of the present invention includes a housing comprising upper and lower sections 15 and 16 respectively. The lower section 16 is provided with a depending collar 17 which is arranged to be clamped to the steering post 11 through the agency of bolts 18, as will be readily understood by those skilled in the art. The housing 16 may be made of metal or other material affording the desired strength and it incloses an insulating material member 19 which, in this instance, is seated on an annular shoulder 20 formed in the side wall 21 of the housing. If desired, the insulating material member 19 may be secured in place by means of screws such as 22 which project through the side flange 21 and threadedly engage suitable tapped openings in the insulating material member.

An annular contact member 23 is seated in the insulating material member 19 and it may be held in place by the desired number of screws, such as indicated at 24, and by a connecting screw or binding post 25 which facilitates the connection of an electric conductor 26 to the described contact ring. A pair of contact segments 27 and 28 are also seated in the insulating material member 19, these segments being approximately semi-circles, as best shown in Fig. 4, and being relatively insulated. These segments may be secured in place in the insulating material member 19 by means of suitable screws, as described in connection with the annular member 23 and they may also be provided with binding posts such as 25 for facilitating the connection thereof to electric conductors 29 and 30. The conductor 26 connects the annular contact member 23 to one post of a storage battery or other source of electric power such as indicated at 31 (see Fig. 4). The conductors 29 and 30 connect the contact segments 27 and 28 to left and right turn electric lamp signals 32 and 33 respectively. The other side of the battery 31 or other source of power is connected to the other terminals of the elements 32 and 33 by suitable conductors or by being grounded in the metal frame work of the vehicle, as indicated. It will thus be apparent that the signal lights 32 and 33 may be energized by electrically connecting the segments 27 and 28 respectively to the annular contact member 23. The wires 26, 29 and 30 may conveniently be guided out of the housing member 16 through a suitable conduit 34 which enters the housing 16 and which may be suitably clamped in fixed position to the steering column 11.

The mechanism for connecting the contact segments 27 and 28 to the annular contact member 23 is carried in the upper housing section 15. This mechanism includes an annular member 35 which is pivoted on pivot pins 36, 36 (see Fig. 2). As shown, the pivot pins 36 extend through the outer flange 37 of the upper housing 15, through diametrically opposed portions of the ring 35 and threadedly engage an inner flange 38 of the upper housing section. Spacers 39 are provided on the pivot pins intermediate the inner flange 38 and the ring 35 to maintain the ring in substantially concentric relation with the upper housing section. At diametrically opposed points, the ring 35, which may be termed a teeter-totter, is provided with contact devices which are adapted to connect the contact segments 27 and 28 respectively and the annular contact member 23.

Each of the contact devices mounted on the teeter-totter 35 consists of an inner member 40 and an outer member 41. The members 40 and 41 are formed of metal, preferably brass or copper, and they include flange portions 42 by means of which they are secured to the annular member 35. As shown, the flanged portions of the inner member 40 are bent to fit the inside of the ring 35 and the flanged portions of the outer member 41 are bent to fit the outside of the member 35. Insulating material pieces 43, 43 are interposed between the flange portions of the members 40 and 41 and connecting screws or bolts 44, 44 extend through the flanges and ring 35 to securely unite the parts. An insulating material sleeve 45 serves to insulate the bolt 44 from both of the contact members 40 and 41 and from the ring 35. Suitable insulating material washers are also interposed between the heads or nuts of the bolts 44 to cause one of them to be insulated from the outer member and the other to be insulated from the inner member.

Each of the members 40 and 41 includes a spring-pressed plunger such as 46, which is axially slidable in a hollow member 47. A spring 48 interposed between the back of the plunger 46 and the end wall of the member 47 serves to yieldingly urge the member 46 outwardly.

The contact elements 46 at each side of the ring 35 are so arranged that they are in alignment with the segment 27 and ring 23 and segment 28 and ring 23 respectively. When the ring 35 is rocked on its pivot to cause either set of contact plungers 46 to engage the respective contact segments and ring, electrical connection will accordingly be completed to energize the signal lamps. For manipulating the teeter-totter 35, the following push button arrangement is provided:

At each side of the upper housing section 15 there is a push button 49, each push button including a stem portion 50 which is axially slidable through a suitable opening in the top wall of the upper housing section. In this instance, the stems 50 are shown as slidable in a suitable bushing 51 which reduces friction and serves to facilitate easy operation of the device. The stems 50 are, in this instance, in the form of sockets for electric lamps 52 of low candle-power. The lamps 52 are of the bayonet attachment type and have double contact bases. Contact elements for engaging the contacts of the lamp base are carried by an insulating material plug 53 suitably mounted in the stem or sleeve 50. Conductors in the form of insulated wires 54 connect the respective contacts of the plug 53 with the inner and outer contact elements 40 and 41, so that when the elements 40 and 41 are connected to the respective segments 27 and 28 and the annular member 23, current will flow, as indicated in the diagram of Fig. 4, through the electric lamp 52. A cover 55 is suitably mounted on the lamp socket 50 and is provided with a jewel 56 through which the light from the lamp 52 will be visible when connection is established.

The lamps 32 and 33 are preferably of high candle-power so as to brightly illuminate the respective signals and, as stated, the lamp 52 is of low candle-power. In order to cause a majority of the electric current to flow to the high candle-power lamps 32 and 33, and to avoid extra bright lighting of the small lamps 52, a shunt 56 is connected across the terminals to which the lamp 52 is connected. The shunt 56 may be of any suitable form but in this instance, it is indicated as being inclosed in a glass tube 57 having metal end caps 58 which are provided with pig-tails connected to the respective terminals mentioned. The shunt proper may be of any suitable resistance wire extending through the glass tube 57 and connected at its ends to the metal caps 58.

The inner ends of the socket sleeves 50 are connected to the rocking ring 35 so as to prevent rotation of the socket and so as to permit limited relative movement of the ring 35 and socket as an incident to the rocking movement of the ring. In this instance, the connection is effected by slotting the socket, as indicated at 59, at a point spaced upwardly from its lower end. A lip or ear 60 is connected to the ring 35 and is adapted to project into the slot 59 so that the socket and ring are positively connected so as to prevent separation thereof. To relieve the slotted portion of the socket of some of the strain incident to adjustment of the ring 35, a second lip 61 may be provided to fit under the inner end of the socket or in a recessed seat 62, as indicated. It will be readily understood that by reason of the lips 60 and 61 fitting into the slot and recesses 59 and 62 respectively in the socket end, the socket will be held against rotation, thereby preventing twisting of the conductors 54, 54 and consequent damage thereto.

It will be apparent that in the event that a right turn is to be made, the button 49 on the right-hand side of the steering wheel center may be depressed to complete a circuit to the right-turn indicator 33. To maintain the circuit so made, the ring 35 is provided with a member 63 having a series of three notches 64, 65 and 63 (see Fig. 6). As shown in Fig. 2, the member 63 is fixedly secured to the ring. The member 63 coacts with the spring-pressed plunger 67 carried by a socket 68 which is fixedly mounted on the outer flange 37 of the upper housing section 15, as clearly shown in Fig. 2. When the plunger 67 engages the notch 65, the ring is maintained in neutral position, i. e., neither signal light is energized. The upper notch 64 maintains the ring in position with the left-hand contacts engaged to energize the left-turn signal 32 and the notch 66, when engaged by the plunger 67, serves to retain the ring in tilted position with the right-hand contacts engaged to energize the right-turn signal 33.

It will be understood that the contact elements 40 and 41 are so located that when the vehicle is being driven in a normally straight course, the contacts 40 and 41 overlie approximately a central point between the ends of the respective segments 27 and 28. Hence, when either push button is depressed, the wheel and upper housing section 15 may be turned nearly 90° before the upper contact elements leave the respective contact segments 27 and 28. This degree of turning permits an initial manipulation of the vehicle to proper position for making the right or left turn without prematurely deenergizing the signal light. When the indicated turn is being made, the steering wheel and upper housing section 15 are normally turned through an angle considerably in excess of 90° but practically no turn such as would be called a right or left turn is made for steering until the steering wheel has been turned through an angle of more than 90°. When the turn is well under way, i. e., when the steering wheel has been turned approximately 90°, the signal light may be deenergized. This may be done manually by either pulling up on the button which was initially depressed or by pressing the opposite button downwardly to restore the neutral position of the ring 35. Preferably, however, automatic means is provided for restoring the contact elements to neutral position. In this instance, such automatic means includes cam inserts 69 which are adapted to engage humps 70 formed on the bottom edge of the rocking ring 35 between the contact plungers 46, 46. It will be understood that when the humps 70 of the ring 35 engage the cams 69, the ring will be adjusted upwardly to neutral position.

It will be observed that the described arrangement requires a reasonably accurate positioning of the mechanism carried by the upper housing section 15 with respect to the contact elements and cam segments carried by the lower housing section. Such positioning is conveniently accomplished by providing a seat 71, recessed in this instance, in the insulating material element 19 of the lower housing section, said seat being adapted to receive the lower end of the inner flange 38 of the upper housing section (see Fig. 3). It will, of course, be understood that positioning of the mechanism within the upper housing section may be controlled by the position of the pivot 36 and hence that the relationship between the contact elements and the end of the flange 38 may be readily determined in accordance with the requirements. It will also be noted that the mechanism disclosed is entirely inclosed in an annular housing which surrounds the steering post, so that the mechanism is maintained comparatively free from the effects of dirt and moisture.

At the present time, most vehicles are equipped with a steering wheel having either three or four spokes connecting the hub of the wheel with the rim. In order to facilitate the use of my signal mechanism with either type of wheel, I provide the following arrangement for anchoring the upper housing section to the wheel for rotation therewith:

A U-shaped bracket 72, which is adapted to embrace one of the spokes 12 of the wheel, is suitably bolted to the top wall of the upper housing section. The upper housing section may conveniently be provided with two openings, one of which receives the U-bracket bolt and the other of which is normally closed by means of a screw plug, as indicated at 73. When a three-spoke wheel is used, the arrangement will appear as shown in full lines in Fig. 5. When a four-spoke wheel is used, the four spokes will be positioned substantially as indicated in dotted lines in Fig. 5. It will be observed that in either event, the push buttons 49, 49 will be located at diametrically opposite points in a substantially horizontal line, thereby providing for the described limited initial turning movement of the wheel without affecting the signal lights when energized.

Other changes and modifications in the mechanism may be made without departing from the spirit of the invention, the scope of which is to be determined by reference to the following claims, the same being construed as broadly as possible consistent with the state of the art.

I claim as my invention:—

1. In an automobile signalling device, a steering wheel and a steering column, a housing comprising upper and lower sections, the upper section being connected to the steering wheel so as to be rotatable therewith and the lower section being fixedly mounted on the steering column, a plurality of relatively insulated, stationary contact elements carried by said stationary housing section, an annular member pivotally mounted in said upper section for rocking movement on an axis extending transversely of the steering column axis, a pair of contact elements mounted on said annular member and respectively on opposite sides of the pivot thereof for movement towards and from said stationary contacts for making and breaking an electric circuit, a pair of push buttons connected respectively to portions of said annular member on opposite sides of its pivot axis and projecting from the top of said upper housing section for facilitating movement of said annular member selectively to effect engagement of the respective movable contact elements with said stationary contact elements, yielding means for retaining said contact elements in adjusted position, and means for automatically restoring said member to normal position to thereby disengage said contact elements.

2. In an automobile signalling device, a steering wheel and a steering column, a two-part housing comprising an upper section connected to the steering wheel for rotation therewith, and a lower section fixedly mounted on said steering column, interengaging means carried by said upper and lower sections for positioning said sections in predetermined relationship in the direction of the axis of the device, an annular member within said housing, means pivotally mounting said annular member for rocking movement, contact devices carried by said annular member on opposite sides of its pivot, contact devices carried by said lower housing section and adapted to be engaged by said first mentioned contact devices, and means for manipulating said annular member comprising push buttons slidably mounted in said upper housing section, having their lower ends engaging a portion of said annular member and provided with a slot spaced upwardly from their lower ends, a lip extending from said annular member into said slot for preventing separation of the push buttons from the annular member, said lip also preventing rotation of the push button relative to the annular member.

3. In an automobile signalling device, a steering wheel and a steering column, a housing comprising upper and lower sections, the upper section being connected to the steering wheel so as to be rotatable therewith and the lower section being fixedly mounted on the steering column, a plurality of relatively insulated, stationary contact members carried by said fixed housing section, a member disposed within and pivotally mounted in said upper housing section for rocking movement about an axis extending transversely of the axis of the steering wheel, contact elements carried by said member on opposite sides of its pivot for electrically connecting certain of said contact members, manually operable means for selectively moving said pivoted member to thereby move either of said contact elements into circuit making position relative to said stationary contact members, said manually operable means comprising push buttons extending through the top of said upper housing section and having their lower ends engaging a portion of said pivoted member and provided with slots spaced upwardly from their lower ends, and lips extending from said pivoted member into said slots for preventing separation of the push buttons from the pivoted member, said lips also preventing rotation of the push buttons relative to the pivoted member.

4. In an automobile signalling device, a steering column and a steering wheel, a two-part housing comprising upper and lower sections, the upper section being connected to the steering wheel so as to be rotatable therewith and the lower section being fixedly mounted on the steering column, a circular stationary contact member and a pair of arcuate contact members carried by said lower housing section, said arcuate contact members being arranged in circularly aligned relation to each other and in concentric and radially spaced relation with said circular contact member, a pair of vertically movable contact elements carried by said upper housing section and respectively movable into circuit making and circuit breaking positions relative to one of said arcuate contact members and said circular contact member, and manually operable means carried by said upper housing for selectively moving said movable contact elements.

5. In an automobile signaling device, a steering wheel and a steering column, a housing comprising upper and lower sections, the upper section being connected to the steering wheel so as to be rotatable therewith and the lower section being fixedly mounted on the steering column, a plurality of relatively insulated normally stationary contact members carried by said fixed housing section, a member disposed within and pivotally mounted in said upper housing section for rocking movement about an axis extending transversely of the axis of the steering wheel, contact elements carried by said member on opposite sides of its pivot for electrically connecting certain of said stationary contact members, said contact elements comprising plungers having recesses in their upper ends, receptacles secured to said pivotal member and vertically slidably receiving said plungers, springs seated in the plunger recess for yieldingly urging the plungers outwardly of the receptacles, and means for limiting such outward movement.

6. In an automobile signalling device, a steering wheel and a steering column, a housing comprising upper and lower sections, the upper section being connected to the steering wheel so as to be rotatable therewith and the lower section being fixedly mounted on the steering column, a plurality of relatively insulated stationary contact members carried by said stationary housing section, a member pivotally mounted in said upper section for rocking movement on an axis extending transversely of the steering column axis, a pair of contact elements mounted on said member and respectively located on opposite sides of the pivot thereof for movement towards and from said stationary contacts for making and breaking electric circuits, means connected with said member and projecting from said housing for facilitating manual movement of said member selectively to effect engagement of the respective movable contact elements with said stationary contact members, yielding means for retaining said member in adjusted position, and means for automatically restoring said member to normal position to thereby disengage said contact elements and members.

7. In an automobile signalling device, a steering wheel and a steering column, a housing comprising upper and lower sections, the upper section being connected to the steering wheel so as to be rotatable therewith and the lower section being fixedly mounted on the steering column, two pairs of relatively insulated stationary contact members carried by said fixed housing section in diametrically opposed relation, a member disposed within and pivotally mounted in said upper housing section for rotation therewith and for rocking movement about an axis extending transversely of and approximately intersecting the axis of the steering wheel, contact elements carried by said member on opposite sides of its pivot axis for electrically connecting the contacts of the respective pairs of contact members, and manually operable means associated with said pivoted member for selectively moving the same to effect engagement of the respective contact elements and members to complete an electric circuit, said contact elements being engageable selectively but not simultaneously with said contact member pairs, and means for yieldably holding said pivoted member in adjusted position.

JOSEPH ARTHUR RUSSELL.